US009394733B2

(12) United States Patent
Franklin et al.

(10) Patent No.: US 9,394,733 B2
(45) Date of Patent: Jul. 19, 2016

(54) ASSEMBLY PROCESS FOR GLUE-FREE HINGE

(71) Applicant: Apple Inc., Cupertino, CA (US)

(72) Inventors: Jeremy C. Franklin, San Francisco, CA (US); Andrew D. Lauder, Oxford (GB); Brian Bentrim, Furlong, PA (US); Haibing Zhu, Kunshan New District (CN)

(73) Assignee: Apple Inc., Cupertino, CA (US)

( * ) Notice: Subject to any disclaimer, the term of this patent is extended or adjusted under 35 U.S.C. 154(b) by 206 days.

(21) Appl. No.: 14/099,653

(22) Filed: Dec. 6, 2013

(65) Prior Publication Data

US 2014/0215758 A1 Aug. 7, 2014

Related U.S. Application Data

(60) Provisional application No. 61/734,895, filed on Dec. 7, 2012.

(51) Int. Cl.
*F16D 1/072* (2006.01)
*E05D 5/12* (2006.01)

(52) U.S. Cl.
CPC .......... *E05D 5/127* (2013.01); *E05Y 2600/506* (2013.01); *Y10T 16/525* (2015.01)

(58) Field of Classification Search
CPC .................. Y10T 29/49833; Y10T 29/49945; F16B 4/004; F16B 17/002; F16B 17/004; F16B 17/006; B23B 49/023; B23P 19/02; B23P 19/064; F16D 1/064; F16D 1/072
See application file for complete search history.

(56) References Cited

U.S. PATENT DOCUMENTS

| | | | | | |
|---|---|---|---|---|---|
| 1,776,615 | A * | 9/1930 | Boothman | B21D 39/04 | 285/148.11 |
| 2,372,485 | A * | 3/1945 | Griffin | B23B 49/023 | 16/2.1 |
| 2,548,840 | A * | 4/1951 | Eksergian | B60B 3/16 | 301/35.625 |
| 2,685,320 | A * | 8/1954 | Rosan | F16B 35/04 | 29/432 |
| 3,055,100 | A * | 9/1962 | Kimpel | F16B 17/004 | 102/517 |
| 3,093,887 | A * | 6/1963 | Prestige | B21D 39/03 | 174/153 R |
| 3,100,333 | A * | 8/1963 | Friend | B21K 1/30 | 29/520 |
| 3,461,936 | A * | 8/1969 | Rosan, Sr. | F16B 37/068 | 29/432 |

(Continued)

*Primary Examiner* — Daniel Wiley
(74) *Attorney, Agent, or Firm* — Downey Brand LLP

(57) ABSTRACT

Glue-free hinge assemblies including press-fit pins are disclosed. A press-fit pin of one material can mechanically attach to a workpiece of another material during a press fit operation. The press-fit pin can include a pin shaft having a chamfered first end, a notched portion, a grooved portion having axial grooves, a clinching feature, and a sealing feature. The chamfered first end can guide the press-fit pin into a counter-bored receiving hole in the workpiece. The axial grooves can etch the workpiece material to rotationally lock the press fit-pin into the receiving hole. The clinching feature can plastically deform workpiece material into the notched portion to axially lock the press-fit pin into receiving hole without causing substantial axial expansion of the workpiece. The sealing feature can form a stepped fit between an outer diameter of the press-fit pin and an outer diameter of the counter-bored receiving hole.

17 Claims, 10 Drawing Sheets

FIG. 4C

(56) References Cited

U.S. PATENT DOCUMENTS

| | | | | | |
|---|---|---|---|---|---|
| 3,673,777 | A * | 7/1972 | Weber | A01D 34/82 | 29/432.1 |
| 3,699,637 | A * | 10/1972 | Rosiek | B32P 19/062 | 29/432.1 |
| 4,118,134 | A * | 10/1978 | Mansel | B21K 25/00 | 29/432 |
| 4,226,454 | A * | 10/1980 | Tranberg | E05B 15/0013 | 292/336.5 |
| 4,269,550 | A * | 5/1981 | DiGiulio | B32B 49/023 | 29/432 |
| 4,419,804 | A * | 12/1983 | Axthammer | B21K 1/18 | 188/322.22 |
| 4,509,381 | A * | 4/1985 | Ikemoto | F16H 3/16 | 29/525 |
| 4,571,111 | A * | 2/1986 | Keogh | F16D 1/072 | 16/433 |
| 4,800,643 | A * | 1/1989 | Higgins | F16B 5/01 | 264/262 |
| 5,033,903 | A * | 7/1991 | Olsson | B23P 11/00 | 29/525 |
| 5,158,390 | A * | 10/1992 | Ito | F01D 5/025 | 29/525 |
| 5,301,877 | A * | 4/1994 | Madison | F16L 13/00 | 239/154 |
| 5,536,101 | A * | 7/1996 | Schwarzler | F16D 1/072 | 403/274 |
| 5,716,156 | A * | 2/1998 | Bayer | F16D 1/072 | 403/280 |
| 6,174,117 | B1 * | 1/2001 | Kawatani | B23P 11/00 | 411/107 |
| 6,565,159 | B1 * | 5/2003 | Kosak | B23P 11/00 | 280/124.125 |
| 7,246,965 | B2 * | 7/2007 | Vanhille | F16C 11/045 | 403/157 |
| 7,374,381 | B2 * | 5/2008 | Maloney | B23P 19/062 | 403/408.1 |
| 8,020,299 | B2 * | 9/2011 | Shirokoshi | F16D 1/072 | 29/520 |
| 8,142,098 | B2 * | 3/2012 | Hashimoto | F16B 4/004 | 29/521 |
| 2002/0041790 | A1 * | 4/2002 | Suzuki | F16B 4/004 | 403/280 |
| 2005/0254890 | A1 * | 11/2005 | Schulz | F16D 1/072 | 403/359.1 |
| 2006/0075838 | A1 * | 4/2006 | Hacker | F16D 1/072 | 74/10.45 |

* cited by examiner

ASSEMBLY PROCESS FOR GLUE-FREE HINGE

CROSS-REFERENCE TO RELATED APPLICATION

This application claims the benefit of priority from U.S. Provisional Patent Application No. 61/734,895, filed on Dec. 7, 2012, which is hereby incorporated herein by reference in its entity.

BACKGROUND

1. Technical Field

The described embodiment relates generally to methods for employing press fit technology. More specifically, specially designed press fits can be used in place of adhesive based support fittings enabling a much smaller overall assembly even when the parts involved are sensitive to low levels of surface strain.

2. Related Art

Anodized components can be susceptible to damage when placed under low levels of strain. When a sufficient amount of strain is put on an anodized part a phenomenon called anodization cracking can occur. Anodization cracking can occur when the underlying substrate of an anodized surface treatment experiences too much surface strain. This surface strain can be caused in some cases by a press-fitting that exerts an undue amount of force on an interior portion of the underlying substrate, essentially causing bulging to occur on the exterior surface of that substrate. Anodization cracking is quite obvious in an end product and generally manifests with a number of ghosting lines or splotches running along the areas where the cracking occurred. Consequently, manufacturers of anodized parts have been justifiably cautious in employing technologies which put strain on anodized parts. Adhesive connections are commonly used when joining anodized parts together. Unfortunately, the use of an adhesive when bonding a pin inside of a channel can result in large components due to the amount of surface area required to achieve a sufficiently strong connection as well as the added cost in time and efficiency in assembly and manufacturing.

Therefore, what is desired are improved fastening techniques.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF EXAMPLE EMBODIMENTS

A representative apparatus and application of methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Press-fit joints rely on deformation of at least one or sometimes both of the components to be joined together. One component will typically be made of a harder material in order to cause the other component to deform around it in a way that holds it firmly in place. Unfortunately, deformation of a component generally causes changes in the exterior shape of the deforming component. Generally such changes are small and scarcely noticeable but when tolerances are tight and/or the component susceptible to stress in some manner then a standard press-fit might be poorly suited for that job. For example, when a pin is being press-fit into a channel or bearing, the resulting deformation is typically barrel-shaped causing a slight increase in diameter of a component. When an anodized surface treatment is used on the exterior of the component that contains such a channel, the aforementioned barrel-shaped deformation can cause a phenomenon commonly referred to as anodization cracking. Anodization cracking tends to manifest itself in ghosting cracks and splotches along the surface of the anodized component. Consequently, when designing a press-fit process for parts with anodized surfaces a delicate balance must be struck between component deformation and surface strain.

Figure 1A:
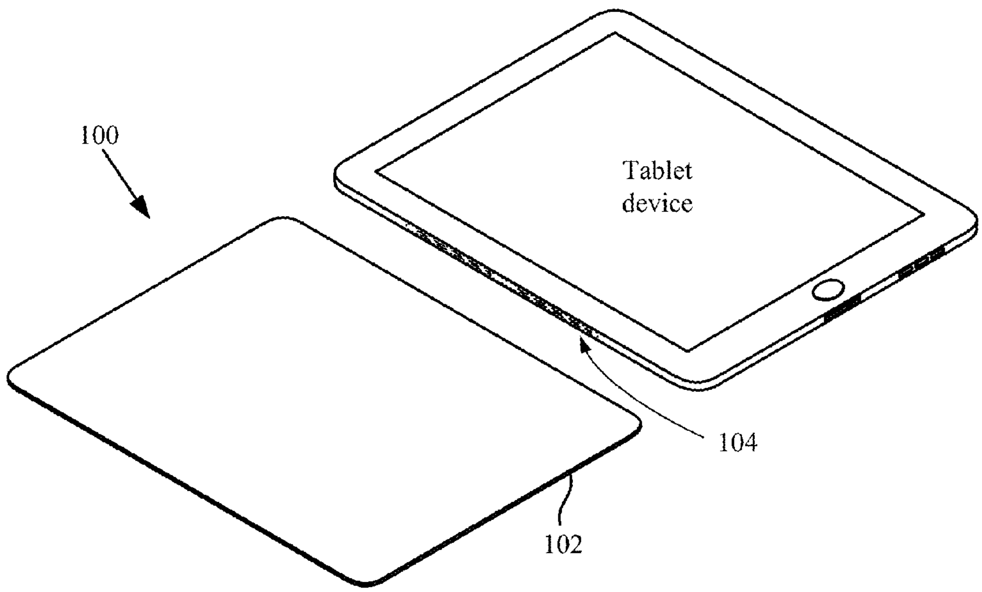
FIG. 1A (related art)
FIGS. 1A and 1B illustrates an accessory for a tablet device.
Figure 1B:
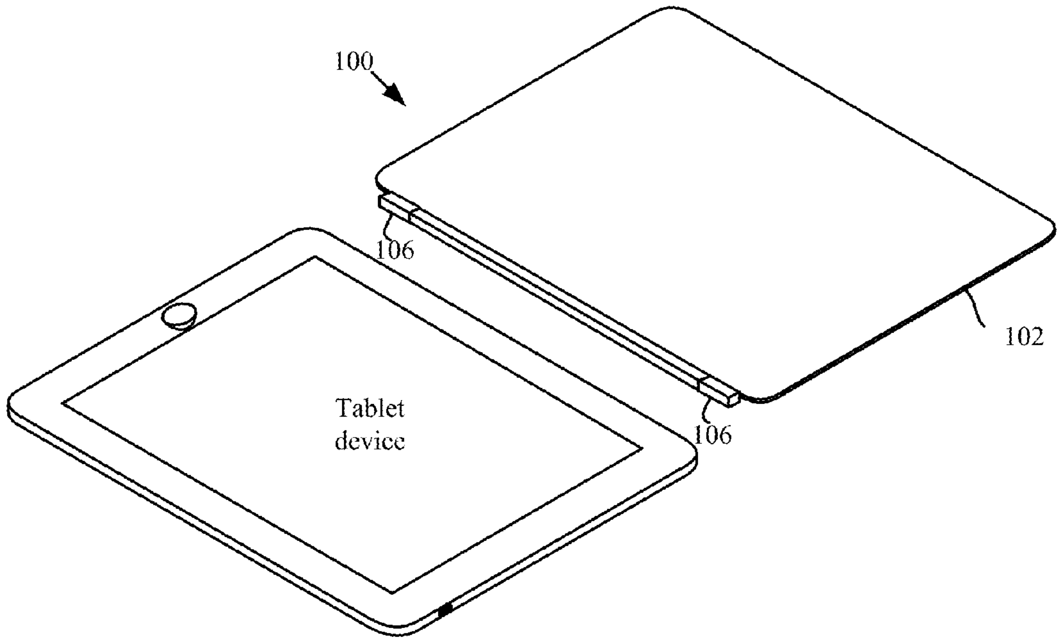
FIG. 1B (related art)

In particular, it is important to maintain the surface appearance of anodized surfaces in those situations where the user's experience of a product includes a strong visual component. For example, a user of an accessory device, such as a Smart Cover® manufactured by Apple, Inc. of Cupertino Calif., can benefit from both the usefulness of the accessory device as well as the visual appearance. Therefore, it is important to maintain the overall look and feel of the accessory device while at the same time assuring a long and useful operational life. Accordingly, FIG. 1A-1B shows an accessory device in the form cover assembly 100. Cover assembly 100 can have a look and feel that complements that of a host device, such as a tablet device, that can add to the overall look and feel of tablet device. Cover assembly 100 is shown in FIGS. 1A and 1B attached to the tablet device in an open configuration with the tablet device fully viewable. Cover assembly 100 can include flap portion 102. In one embodiment, flap portion 102 can have a size and shape in accordance with the tablet device. Flap portion 102 can be pivotally connected to accessory attachment feature 104 on the tablet by way of hinge assembly 106.

Figure 2:
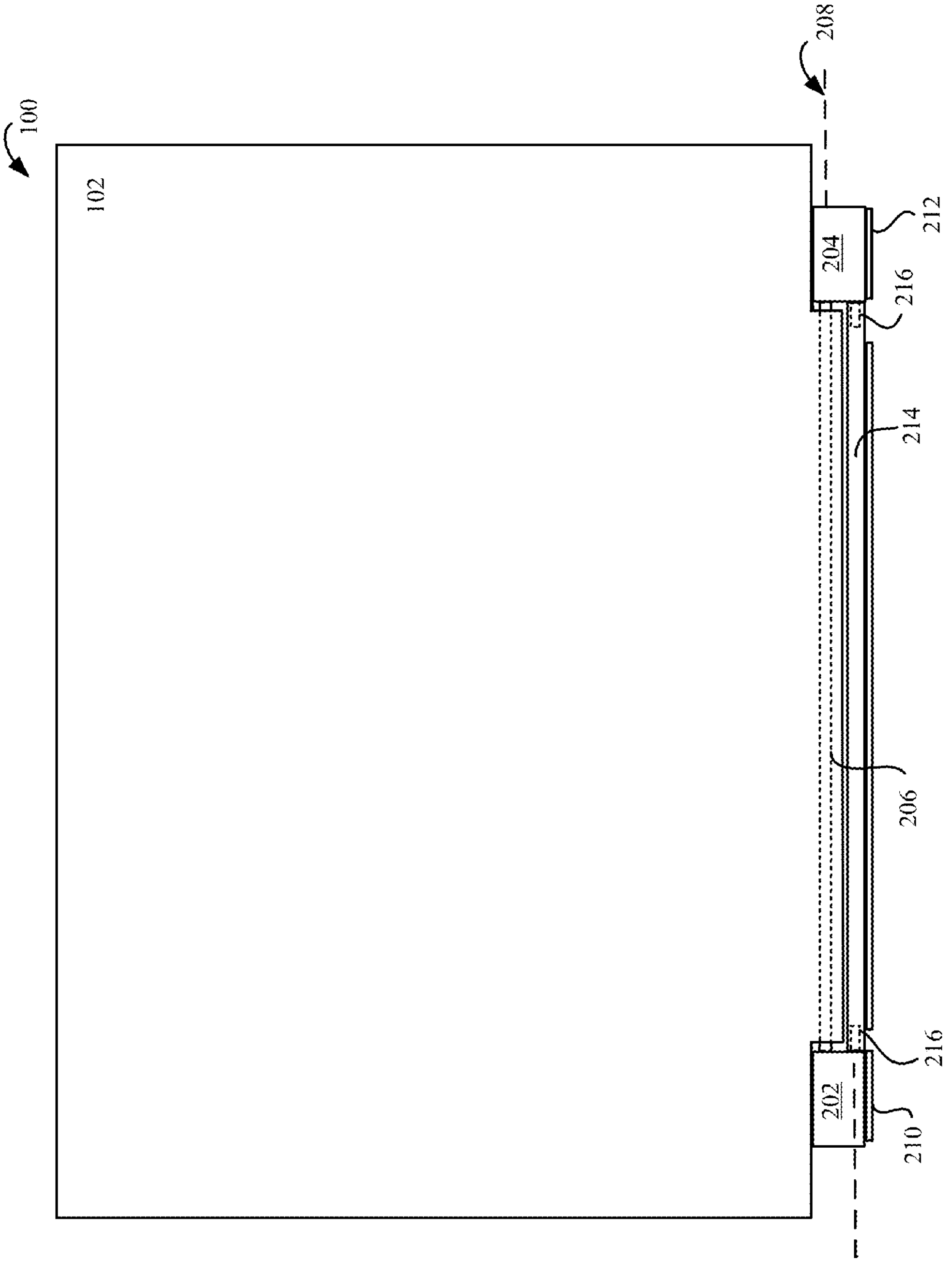
FIG. 2 (related art)
FIG. 2 illustrates components associated with a hinge assembly for a tablet device accessory.

FIG. 2 shows hinge assembly 200 as an embodiment of hinge assembly 106. Hinge assembly 200 can include first hinge portion (also referred to as first hinge lug) 202 and a second hinge portion (or second hinge lug) 204 disposed opposite the first hinge lug. First end lug 202 can be rigidly connected to second end lug 204 by way of long hinge pin 206 (shown in dotted line form) incorporated into a tube portion of flap portion 102. The longitudinal axis of connecting rod 206 can act as pivot line 208 about which flap portion 102 can pivot relative to the hinge assembly. Long hinge pin 206 can be formed of metal or plastic strong enough to rigidly support cover assembly 100 as well as any objects, such as tablet device, magnetically attached to magnetic attachment feature 104.

In order to prevent metal on metal contact, first hinge lug 202 and second hinge lug 204 can each have protective layers 210 and 212, respectively, attached thereto. Protective layers (also referred to as bumpers) 210 and 212 which can prevent direct contact between first hinge lug 202 and second hinge lug 204 with a tablet housing. This is particularly important when end lugs 202, 204 and the tablet housing are formed of metal. The presence of bumpers 210 and 212 can prevent metal to metal contact between the hinge lugs and the tablet housing, thereby eliminating the chance of substantial wear and tear at the point of contact that can degrade the overall look and feel of tablet device.

First end lug 202 and second end lug 204 can be magnetically connected to the tablet device by way of hinge span 214 that is configured to pivot with respect to the hinge lugs. The pivoting can be accomplished using short hinge pins 216 (a portion of which can be exposed). Short hinge pins 216 can rotatably secure hinge span 206 to both first hinge lug 202 and second hinge lug 204. Hinge span 214 can include magnetic elements. The magnetic elements can be arranged to magnetically attach hinge span 214 to a magnetic attachment feature having a matching arrangement of magnetic elements in the electronic device. In order to fix the magnetic elements in place within hinge span 214, short hinge pins 216 can be used to secure magnetic elements located at both ends of hinge span 214 reducing the likelihood that the magnetic elements in hinge span 214 will move about having the potential for disrupting the magnetic attachment between hinge span 214 and the magnetic attachment feature in the tablet device.

Figure 3A:
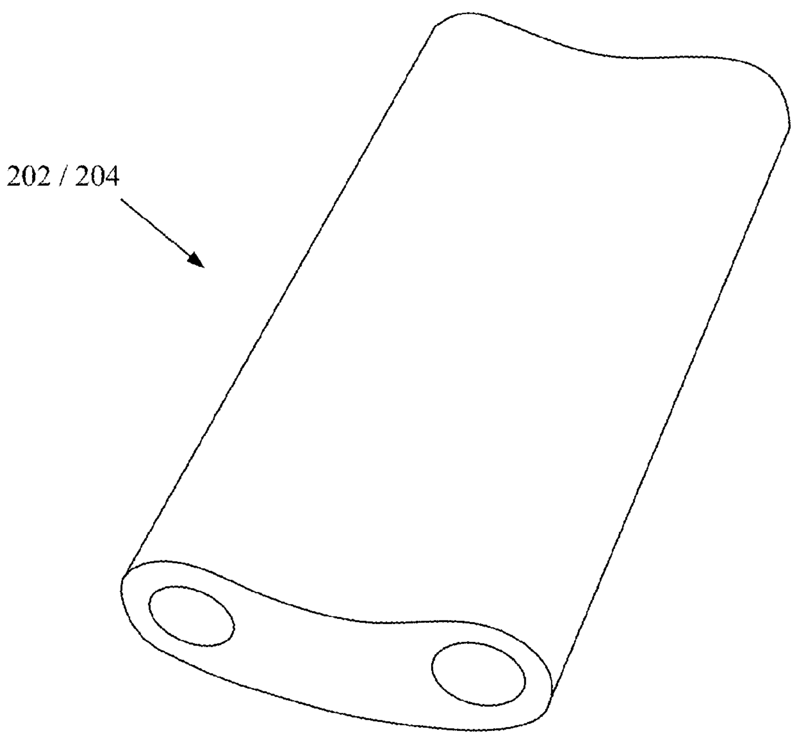
FIG. 3A (related art)
FIG. 3A illustrates a hinge lug designed to be attached to hinge pins with an adhesive compound.
Figure 3B:
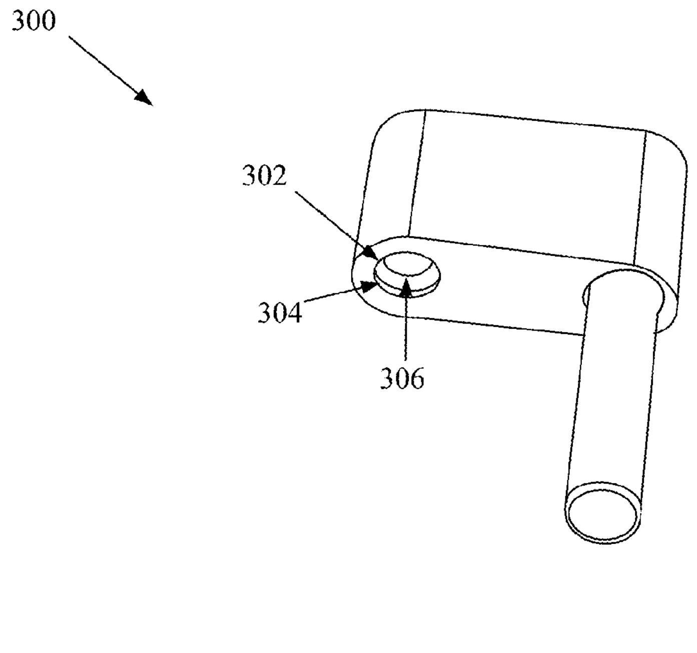
FIG. 3B illustrates a press-fit type hinge lug in accordance with the described embodiment.

FIG. 3A illustrates an alternative to hinge lugs 202, and 204 as end lug 300. Although end lug 300 is greatly reduced in size, end lug 300 can provide an attachment of similar strength a press-fit attachment as compared to an adhesive joint. FIG. 3A is substantially larger than FIG. 3B primarily because adhesive attachments require a substantial surface area to achieve an equivalently strong connection when compared to a smaller press fit hinge lug 300. The hinge lug illustrated in FIG. 3A has about the same holding power as the hinge lug illustrated in FIG. 3B (the two hinge lugs are shown at the same scale to give an accurate idea of actual size savings). Hinge lug 300 can also have smaller corresponding short hinge pins than hinge lug 202/204 as total overlapping area is much less of an issue with a press-fit joint. Hinge lug 300 includes counter-bored cavity 302 designed to interact with press-fit features formed on a hinge pin. Counter-bored cavity 302 has outer diameter 304 and inner diameter 306. In some other embodiments cavity 302 can have a counter-sunk geometry.

Figure 4A:
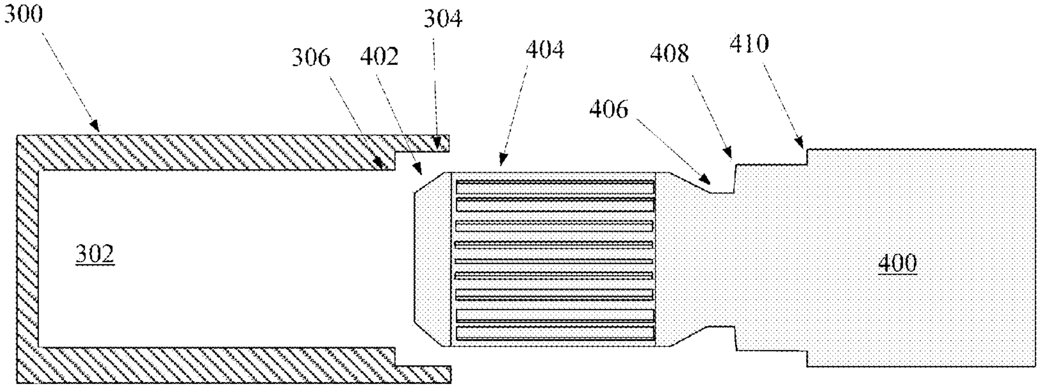
FIG. 4A illustrates a side cross-sectional view of a press fit pin arranged just outside a hinge lug with a counter-bored cavity in accordance with the described embodiment.

FIG. 4A illustrates a cross-sectional view of hinge pin 400 being inserted into hinge lug 300. Hinge pin 400 can include a number of press fit features. Hinge lug 300 has counter-bored cavity 302 designed to receive hinge pin 400. In this embodiment hinge pin 400 can be made of steel and hinge lug 300 can be made of anodized aluminum. Lead in section 402 includes a chamfered portion arranged on a front portion of hinge pin 400 that allows hinge pin 400 to be guided in to inner diameter 306 of counter-bored cavity 302. Hinge pin 400 also includes grooved portion 404. Grooved portion 404 has a diameter slightly larger than inner diameter 306. Upon insertion of hinge pin 400 into inner diameter 306 portion of cavity 302 grooved portion 404 scrapes against the inner surface of inner diameter 306 allowing grooved portion 404 to become somewhat embedded into inner diameter 306, thereby giving hinge pin 400 strong anti-rotation properties. Grooved portion 404 is followed by notch portion 406. Notch portion 406 is then followed by clinch feature 408. Finally, sealing feature 410 steps the diameter of hinge pin 400 out to its full diameter, which can be just slightly smaller than outer diameter 304.

Figure 4B:
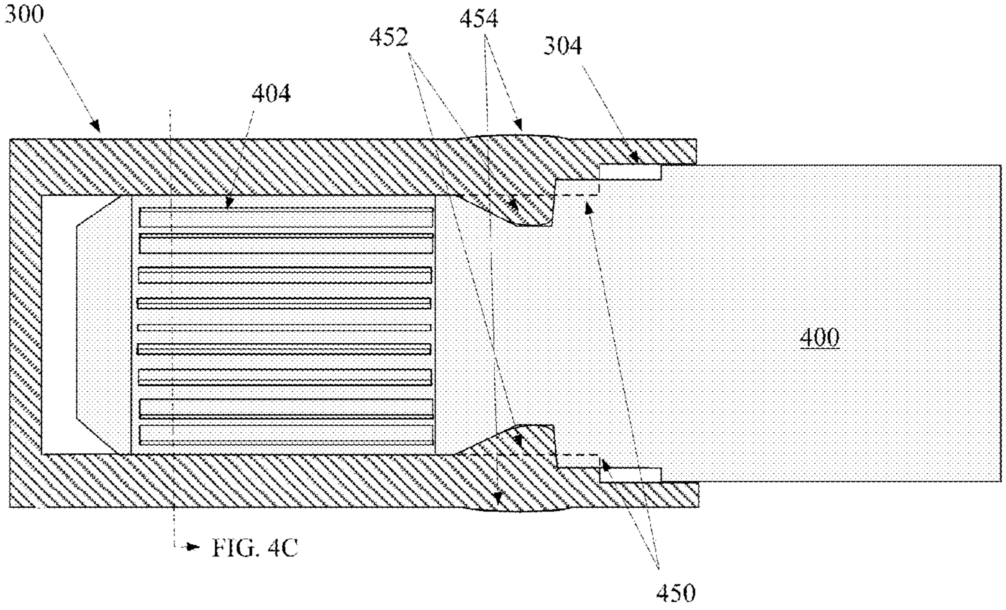
FIG. 4B illustrates a side cross-sectional view of a press-fit pin embedded within a hinge lug in accordance with the described embodiment.

FIG. 4B illustrates the effects on hinge lug 300 of pressing hinge pin 400 into it. Dashed portions 450 shows the original dimensions of hinge lug 300 before hinge pin 400 was pressed into it. As hinge pin 400 is pushed into counter-bored cavity 302, the leading edge of clinch feature 408 comes into contact with the rim of inner diameter 306. Since steel is harder than aluminum the rim of inner diameter 306 can be plastically deformed into the open area created by notch portion 406. Once deformed portion 452 of hinge lug 300 fills notch portion 406 of hinge pin 400, hinge pin 400 is essentially locked in place. The combination of grooved portion 404, which prevents rotation and deformed portions 452 which prevent forward and rearward travel solidly embeds hinge pin 400 in counter-bored cavity 302. Sealing feature 410 can have a diameter just slightly smaller than outer diameter 304 allowing sealing feature 410 to provide a cosmetic seal between hinge lug 300 and hinge pin 400. It should also be noted that as hinge lug 300 is deformed it does not deform only into notch portion 406. Deformation 454 also occurs during the insertion of hinge pin 400. Deformation 454 is an unwanted side effect of the pressure exerted upon hinge lug 300 by hinge pin 400. The size of notch portion 406 and the diameter of clinch feature 408 can be adjusted to minimize the size of deformation 454, effectively allowing surface strain to be reduced. Consequently, by sufficiently minimizing the size of deformation 454 anodization cracking can be avoided, resulting in a robust low profile glue-free hinge. It should be noted that while this embodiment has been described as a steel hinge pin with an aluminum hinge lug the contemplation of the described embodiment is much wider and the hinge lug can be made from any material that will plastically deform around the hinge pin.

Figure 4C:
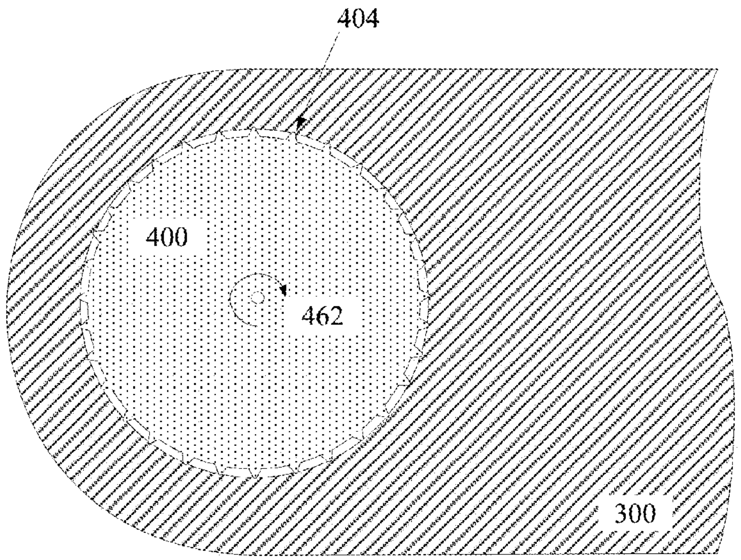
FIG. 4C illustrates a cross-sectional view taken along a line illustrated in FIG. 4B in accordance with the described embodiment.

FIG. 4C illustrates a front cross-sectional view of hinge pin 400 inserted into hinge lug 300 along the cross-section line illustrated in FIG. 4B. In FIG. 4C hinge pin 400 is illustrated with a number of grooved portions 404 protruding from it. Grooved portions 404 trace small grooves in a surface portion of counter bored cavity 302 as it is pushed into counter bored cavity 302. In this way grooved portions 404 become partially embedded in counter bored cavity 302 thereby preventing hinge pin 400 from twisting inside hinge lug 300 when rotational force 462 is put upon it. It should be noted that in some embodiments grooved portions 404 can be so firmly embedded that notch portion 406 fails from rotational force 462 prior to grooved portions 404 becoming dislodged. Consequently in embodiments where greater rotational forces are a more important concern grooved portions 404 can be moved. The next figure will illustrate a hinge pin having grooved portions arranged behind its clinch feature.

Figure 4D:
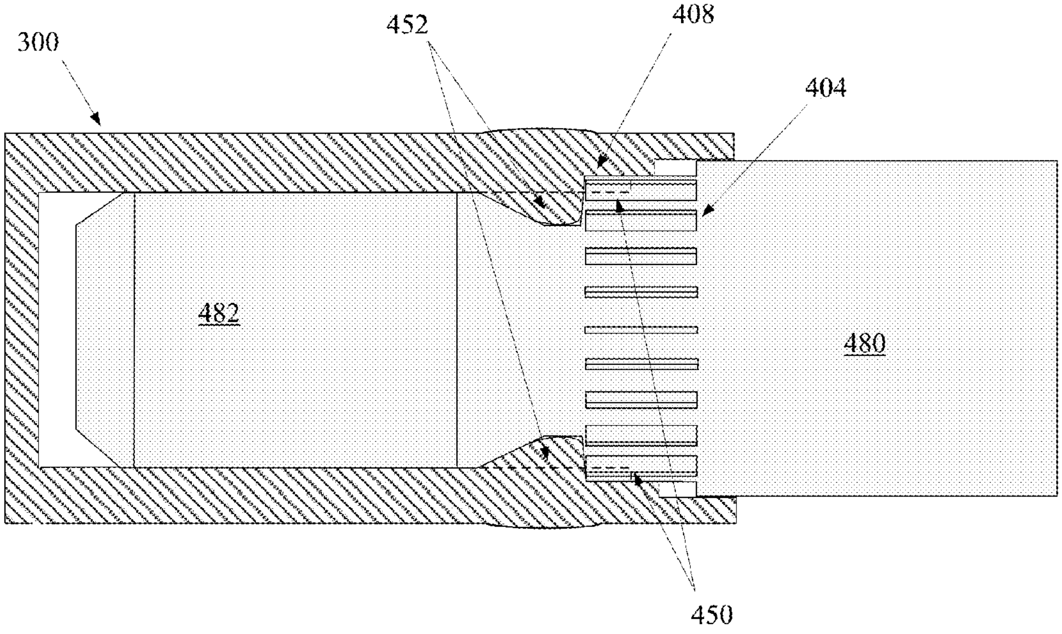
FIG. 4D illustrates a side cross-sectional view of an alternate press fit pin configuration.

FIG. 4D illustrates an alternative hinge pin 480. Hinge pin 480 has grooved portions 404 disposed behind clinch feature 408. When a rotational force is applied to hinge pin 408 grooved portions 404 are not acted upon through notch portion 406. This configuration allows hinge pin 480 to resist rotational forces until embedded grooved portions 404 actually dislodge. Leading portion 482 of hinge pin 480 functions as a leading portion for notch 406 and as a guide for keeping hinge pin 480 properly aligned inside counter bored cavity 302 so that clinch feature 408 properly engages hinge lug 300. In testing configurations similar to hinge pin 480 yielded an increase in rotational stress resistance of almost two times. Unfortunately, testing showed that such a configuration also resulted in a significant decrease in pull out resistance. Consequently, one or the other configurations can be more or less useful depending on whether design tolerances are stricter in rotational or pull out resistance.

Figure 5A:
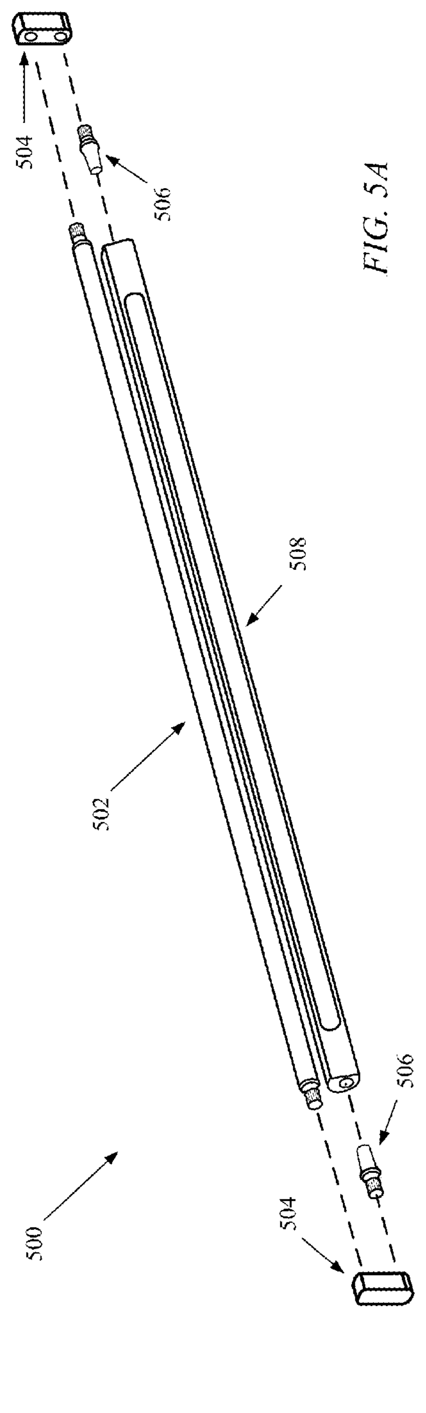
FIG. 5A illustrates an exploded view of a glue-free hinge assembly in accordance with the described embodiment.
Figure 5B:
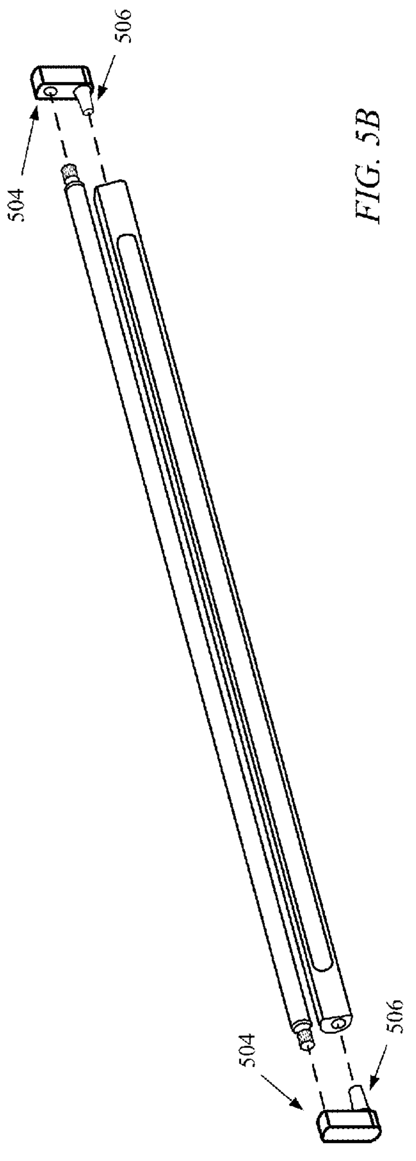
FIG. 5B illustrates an exploded view of a glue-free hinge assembly where the short pins have been inserted into the hinge lugs.

FIG. 5A illustrates an exploded view of glue-free hinge 500. Glue-free hinge 500 has a number of components. Press-fit attachment features on long hinge pin 502 rigidly connect long hinge pin 502 to hinge lugs 504. Short hinge pins 506 have press-fit features on one end and are smooth and cylindrical in shape on the other end. The press-fit features on short hinge pins 506 allow short hinge pins 506 to be rigidly coupled to hinge lugs 504. The smooth, cylindrical ends of short hinge pins 506 allow hinge span 308 to freely rotate about short hinge pins 506. In FIG. 5B the first step in an assembly process is shown. Short hinge pins 506 are inserted into hinge lugs 504. This operation can be completed by fixing a hinge lug 504 in place and applying force to short hinge pin 506 sufficient to fully engage the press-fit attachment features of short hinge pin 506 inside hinge lug 504. By pre-fitting hinge lugs 504 with short hinge pins 506 only the press-fit connectors on long hinge pin 502 need to be connected when assembling glue-free hinge 300. Another advantage of press-fitting short hinge pins 506 in hinge lugs 504 in an earlier operation is that hinge lugs 504 with evidence of anodization cracking can be removed prior to assembly of glue-free hinge 300.

Figure 6A:
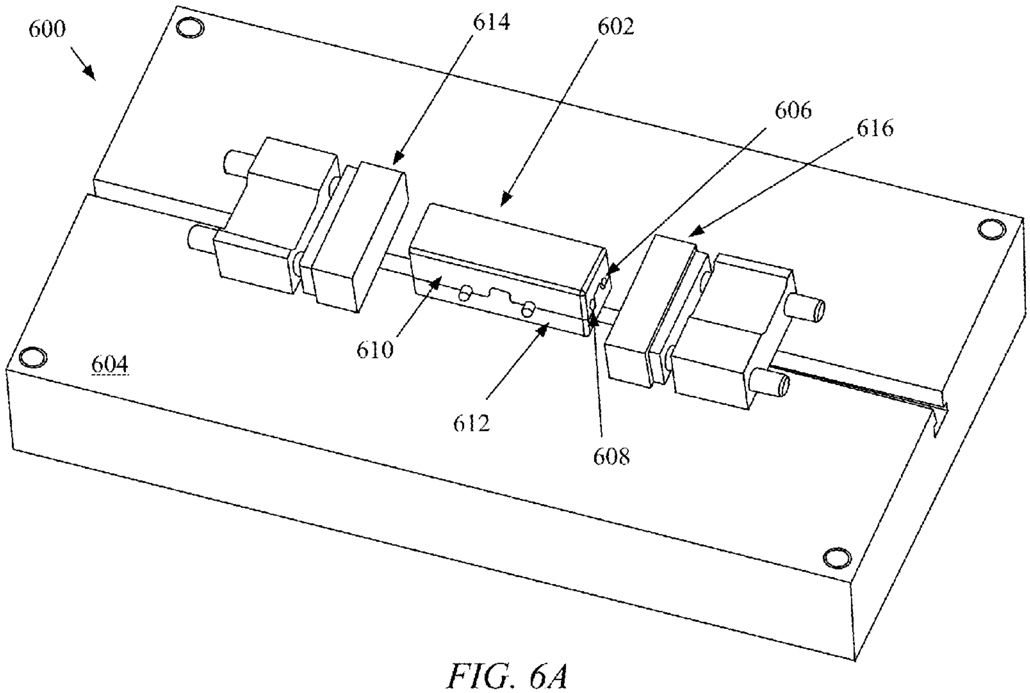
FIG. 6A illustrates a perspective view of a hinge assembly fixture.

FIG. 6A illustrates a perspective view of hinge assembly fixture 600. Hinge assembly fixture 600 is useful primarily due to the relatively thin nature of the long hinge pin. If an unsupported long hinge pin were subjected to the axial forces required to press-fit the ends of the long hinge pin into the hinge lugs, then the long hinge pin can be bent or broken during the operation. Hinge assembly fixture 600 has center block 602 designed to stabilize both the hinge span and long hinge pin while the glue-free hinge is assembled. Center block 602 is mounted upon hinge assembly fixture base 604. Center block 602 can have channel 606 for stabilizing the long hinge pin and channel 608 for stabilizing the hinge span. The long hinge pin and hinge span can be inserted into center block 602 by lifting upper portion 610 of center block 602 off of lower portion 612. In this way channels 606 and 608 are exposed and the hinge span and the long hinge pin can be placed in their respective channels. After upper portion 610 of center block 602 is replaced, left lug fixture 614 and right lug fixture 616, which can be hydraulically driven, are used to press the left and right hinge lugs onto the long hinge pin and hinge span.

Figure 6B:
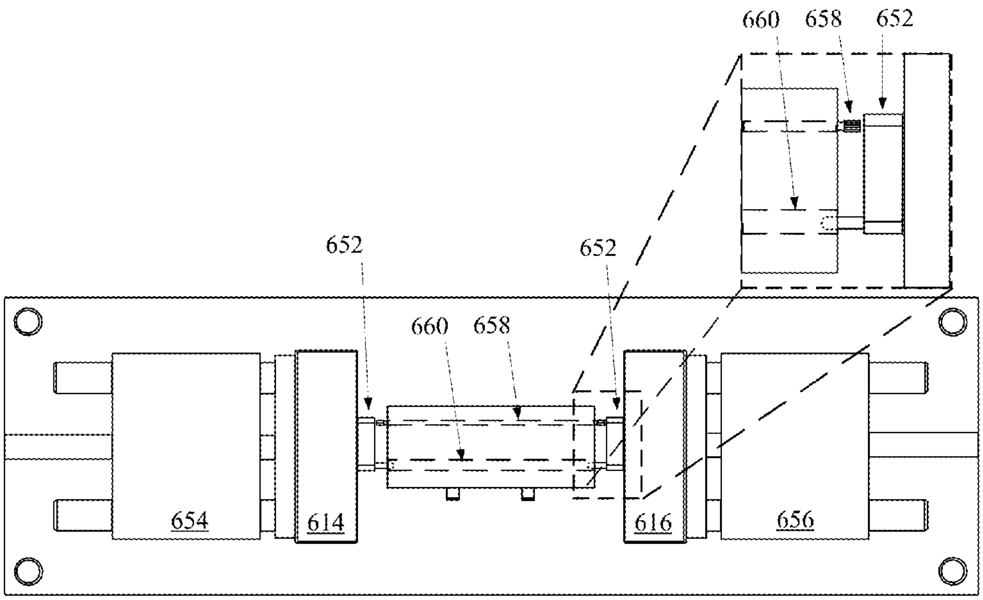
FIG. 6B illustrates a top view of a hinge assembly fixture with the components for a glue-free hinge assembly mounted on it.

FIG. 6B illustrates a top view of hinge assembly fixture 600 with a hinge assembly inserted and ready to be assembled. Hinge lugs 652 can be temporarily, mechanically attached to left and right lug fixtures 614 and 616. Left and right piston assemblies 654 and 656 can exert hydraulic pressure upon left and right lug fixtures 614 and 616 thereby pushing hinge lugs 652 onto long hinge pin 658 and hinge span 660. It should be noted that it is important for both hinge lugs 652 to receive an equal amount of force, so that each hinge lug 652 is properly attached to long hinge pin 658. One way to accomplish this is to put left and right piston assemblies hydraulically in line. In other words each piston assembly would be fed from the same pressurized hydraulic reservoir allowing each to be driven by precisely the same amount of pressure, thereby equalizing the force placed upon each hinge lug 652. In another embodiment hinge assembly fixture 600 can include only a single piston assembly pushing only one hinge lug on at a time, or bracing the other hinge lug against a fixed surface, thereby also achieving an equalized pressure application on each side of the glue-free hinge assembly. It should be noted that while hinge span 660 is supported by center block 602 it does not require any structural support during the assembly operation as the smooth surfaces of the short pins do not place a significant amount of stress on hinge span 660.

Figure 7:
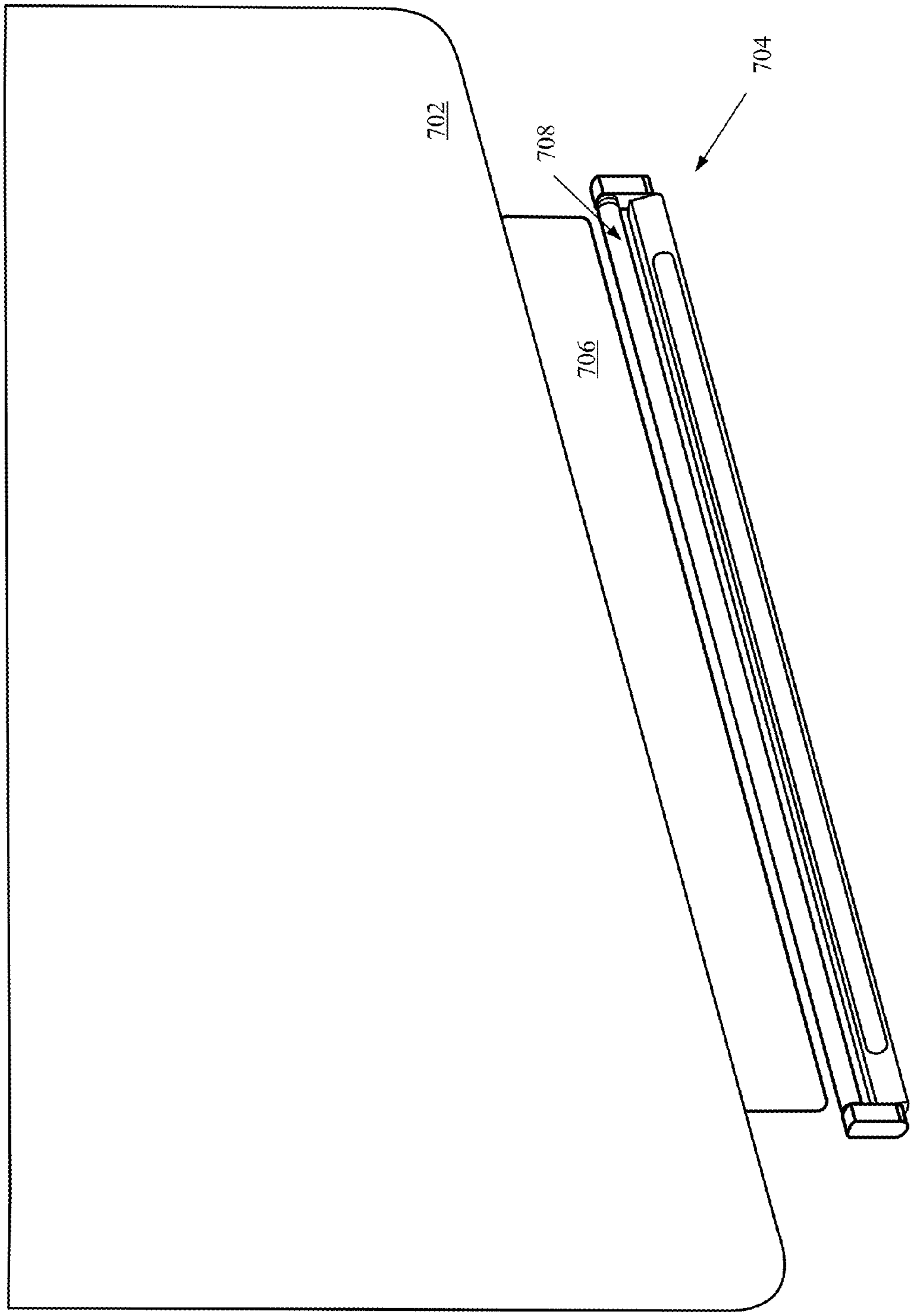
FIG. 7 illustrates an assembled hinge assembly and a flap portion ready to be wrapped around the long hinge pin portion of the hinge assembly in accordance with the described embodiment.

FIG. 7 illustrates a process by which a flap 702 is attached to glue-free hinge assembly 704. Flap 702 can have tab portion 706 extending from its bottom edge. Tab portion 706 can be a continuation of one layer of flap portion 702. Tab portion 706 can be long enough to wrap around long hinge pin 706 of glue-free hinge assembly 704. After tab portion 706 is wrapped around long hinge pin 706 it can be glued back onto flap portion 702, thereby forming a tube wrapping around long hinge pin 708. In one embodiment the resulting tube can have a soft interior allowing it to easily rotate around long hinge pin 708. In this way flap 702 can rotate freely around long hinge pin 708. In another embodiment flap 702 can have a preformed tube with a slit arranged down the length of the tube, allowing flap portion 702 to be slipped over long hinge pin 708. It should be noted that while flap 702 can be arranged on long hinge pin 708 prior to assembly of glue-free hinge assembly 704, doing so would require a portion of flap 702 to be subjected to compression in the hinge assembly fixture described along with FIGS. 6A and 6B. In some situations where flap 702 is susceptible to damage by compressive forces, this might not be desirable.

Figure 8:
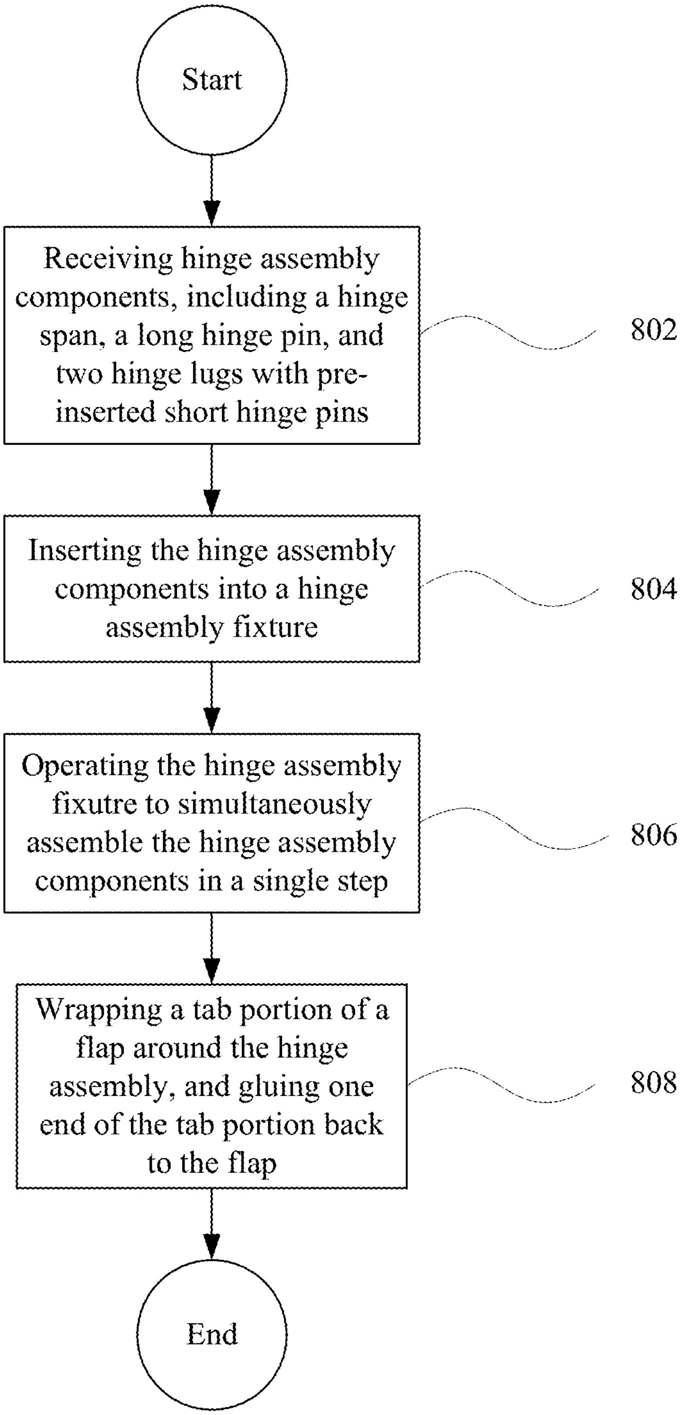
FIG. 8 shows a flow chart detailing an assembly process for a glue-free hinge assembly in accordance with the described embodiment.
Figure 9:
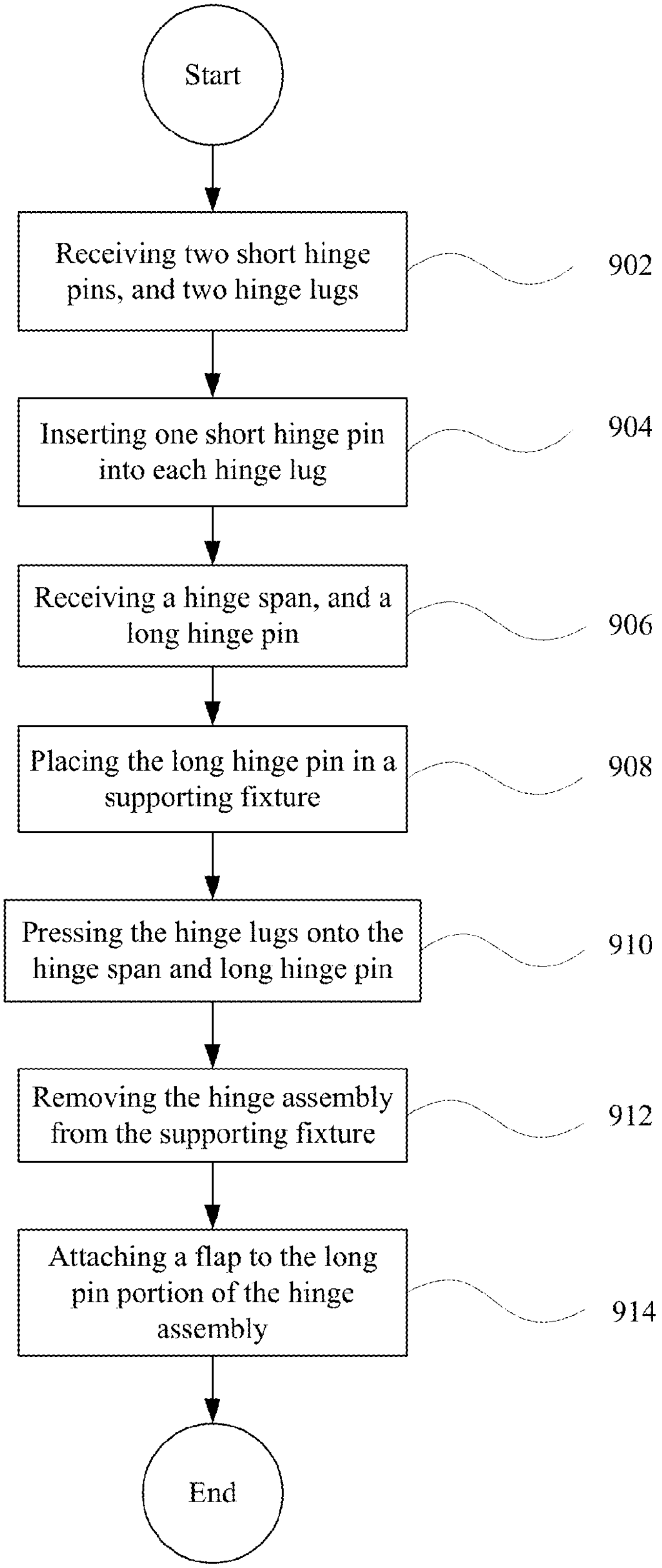
FIG. 9 shows a flow chart detailing another assembly process for a glue-free hinge assembly.

FIG. 8 shows a flowchart detailing a method for assembling an accessory device. In a first step 802 components of the hinge assembly are received. The hinge assembly components include the following: a hinge span; a long hinge pin; and two hinge lugs each having a pre-inserted short hinge pin. In step 804 the hinge assembly components can be arranged inside a hinge assembly fixture. The hinge assembly fixture includes a center block for stabilizing the long hinge pin and the hinge span during the assembly operation. The hinge assembly fixture can also include hydraulic pistons for pushing the hinge lugs onto the hinge span and long hinge pin. In step 806 two hydraulic pistons can push one hinge lug each onto the stabilized hinge pin and hinge span, resulting in the assembly of the hinge assembly in a single step. In step 808 a tab portion of a flap is wrapped around the long pin portion of the hinge assembly. After the tab portion wraps around the flap it is glued back to the flap resulting in a tube being formed around the long pin. The tube allows the flap to freely rotate around the long pin portion of the hinge assembly FIG. 9 shows a flowchart detailing another method for assembling an accessory device. In a first step 902 two short pins and two anodized hinge lugs are received. The short pins each have one end with press-fit features and another end which is smooth and cylindrical in shape. The hinge lugs each have two counter-bored holes designed to deform around pins having press-fit features similar to the features found on the short pins. In step 904 the press-fit feature end of one short pin is inserted into each hinge lug. In one manufacturing process the anodized hinge lugs can then be inspected for any signs of anodization cracking. If any are spotted the insertion step can be repeated with new pins and hinge lugs. In step 906 one hinge span and one long hinge pin are received. In step 908 the long hinge pin is inserted into a supporting fixture. In some embodiments the hinge span can also be supported in the same fixture to achieve correct spacing between the two components. In step 910 the hinge lugs, each already having a short pin inserted, are simultaneously pressed onto the hinge span and long hinge pin. In one embodiment the pressing of the hinge lugs can be achieved by a hydraulic press system integrated into the supporting fixture while in other embodiments the pressing can be accomplished using any system capable of providing a consistent amount of force over a fixed distance. In another variation of the described embodiment the hinge lugs can be attached one at a time. In step 912 the assembled hinge assembly can be removed from the supporting fixture. In step 914 a flap portion can be attached to the hinge assembly. In one embodiment a tab extending off one side of the flap portion can be wrapped around the long hinge pin portion of the hinge assembly and then glued back to itself. In another embodiment the flap portion can have a formed tub with a slit in it allowing the flap portion to be slipped around the long hinge pin after the hinge assembly is assembled.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A press-fit pin assembly formed of a first material mechanically attached to a workpiece formed of a second material during a press fit operation wherein the second material captures the press fit pin by plastic deformation, the press-fit pin comprising:

a pin shaft having a chamfered first end;

a notched portion located distal to the chamfered first end;

a grooved portion having a plurality of axial grooves and located either on a first side of the notched portion proximate the chamfered first end, or on a second side of the notched portion, opposite the first side; and a clinching feature located on the second side of the notched portion, and having a larger diameter than the notched portion;

wherein during the press fit operation:

the chamfered first end guides the press-fit pin into a counter-bored receiving hole in the workpiece, the counter-bored receiving hole having an inner diameter and an outer diameter larger than the inner diameter, the axial grooves etch the second material of the workpiece at either the inner or outer diameter of the receiving hole to rotationally lock the press fit pin into the receiving hole, and the clinching feature plastically deforms a portion of the workpiece into the notched portion to axially lock the press fit pin into the receiving hole without causing substantial axial expansion of the workpiece.

2. The press-fit pin assembly as recited in claim 1, wherein the grooved portion is arranged between the chamfered first end and the notched portion.

3. The press-fit pin assembly as recited in claim 1, wherein the grooved portion is arranged proximate to the clinching feature.

4. The press-fit pin assembly as recited in claim 1, wherein the first material is made of a metal that is harder than the second material of the workpiece.

5. The press-fit pin assembly of claim 1, wherein the outer diameter of the press-fit pin is slightly smaller than the outer diameter of the counter-bored receiving hole.

6. The press-fit pin assembly of claim 1, wherein a sealing feature is located adjacent the clinching feature, opposite the notched portion, and the sealing feature is received into the outer diameter of the counter-bored receiving hole to form a stepped fit between an outer diameter of the press-fit pin and the outer diameter of the counter-bored receiving hole.

7. The press-fit pin assembly of claim 6, wherein the sealing feature provides a cosmetic seal between the press-fit pin and the workpiece.

8. The press-fit pin assembly of claim 7, wherein the cosmetic seal hides from view all of the workpiece portion that is plastically deformed into the notched portion by the clinching feature.

9. The press-fit pin assembly of claim 1, wherein the workpiece portion that is plastically deformed into the notched portion by the clinching feature is from a region defined by the inner diameter of the counter-bored receiving hole.

10. The press-fit pin assembly of claim 1, wherein the press-fit pin combines with the workpiece to form part of a glue-free hinge assembly.

11. The press-fit pin assembly of claim 10, wherein the glue-free hinge assembly is for a tablet device accessory.

12. The press-fit pin assembly of claim 1, further comprising:

a chamfered second end located on the pin shaft opposite the chamfered first end;

a second notched portion located proximate the chamfered second end;

a second grooved portion having a plurality of axial grooves and located proximate the chamfered second end;

a second clinching feature located proximate the chamfered second end; and a second sealing feature located proximate the chamfered second end.

13. A glue-free hinge, comprising:

one or more hinge lugs formed from a first material, each of the one or more hinge lugs having one or more counter-bored receiving holes formed therein, each of the receiving holes having an inner diameter and an outer diameter larger than the inner diameter; and one or more press-fit pins formed from a second material and press-fit into a respective receiving hole from the one or more receiving holes, each of the one or more press-fit pins having:

a pin shaft having a chamfered first end that guides the press-fit pin into the respective receiving hole, a notched portion located distal to the chamfered first end, a grooved portion having a plurality of axial grooves and located either on a first side of the notched portion proximate the chamfered first end, or on a second side of the notched portion, opposite the first side, wherein the axial grooves etch the first material of the hinge lug at either the inner or outer diameter of the respective receiving hole to rotationally lock the press-fit pin into the respective receiving hole, and a clinching feature located on the second side of the notched portion, and having a diameter larger than the notched portion, wherein the clinching feature plastically deforms a portion of the hinge lug into the notched portion to axially lock the press-fit pin into the respective receiving hole without causing substantial axial expansion of the hinge lug around the respective receiving hole.

14. The glue-free hinge of claim 13, each of the one or more press-fit pins further having: a sealing feature adjacent the clinching feature and opposite the notched portion that is received into the outer diameter of the respective receiving hole to form a stepped fit between an outer diameter of the press-fit pin and the outer diameter of the respective receiving hole.

15. The glue-free hinge of claim 14, wherein the sealing feature provides a cosmetic seal between the press-fit pin and the hinge lug.

16. The glue-free hinge of claim 15, wherein the cosmetic seal hides from view all of the hinge lug portion that is plastically deformed into the notched portion by the clinching feature.

17. An electronic device accessory, comprising:

one or more hinge lugs formed from a first material, each of the one or more hinge lugs having one or more counter-bored receiving holes formed therein, each of the receiving holes having an inner diameter and an outer diameter larger than the inner diameter; and one or more press-fit pins formed from a second material and press-fit into a respective receiving hole from the one or more receiving holes, each of the one or more press-fit pins having:

a pin shaft having a chamfered first end that guides the press-fit pin into the respective receiving hole, a notched portion located distal to the chamfered first end, a grooved portion having a plurality of axial grooves and located either on a first side of the notched portion proximate the chamfered first end, or on a second side of the notched portion, opposite the first side, wherein the axial grooves etch the first material of the hinge lug at either the inner or outer diameter of the respective receiving hole to rotationally lock the press-fit pin into the respective receiving hole, and a clinching feature located on the second side of the notched portion, and having a diameter larger than the notched portion, wherein the clinching feature plastically deforms a portion of the hinge lug into the notched portion to axially lock the press-fit pin into the respective receiving hole without causing substantial axial expansion of the hinge lug around the respective receiving hole.

* * * * *